US009497013B2

(12) United States Patent
Maruta

(10) Patent No.: US 9,497,013 B2
(45) Date of Patent: Nov. 15, 2016

(54) RADIO COMMUNICATION SYSTEM, BASE STATION, AND COMMUNICATION METHOD

(71) Applicant: NEC CORPORATION, Tokyo (JP)

(72) Inventor: Yasushi Maruta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 96 days.

(21) Appl. No.: 14/378,028

(22) PCT Filed: Dec. 21, 2012

(86) PCT No.: PCT/JP2012/083233
§ 371 (c)(1),
(2) Date: Aug. 11, 2014

(87) PCT Pub. No.: WO2013/118409
PCT Pub. Date: Aug. 15, 2013

(65) Prior Publication Data
US 2015/0036522 A1 Feb. 5, 2015

(30) Foreign Application Priority Data

Feb. 10, 2012 (JP) .................................. 2012-027157

(51) Int. Cl.
*H04L 12/26* (2006.01)
*H04L 5/00* (2006.01)
(Continued)

(52) U.S. Cl.
CPC ........... *H04L 5/0057* (2013.01); *H04L 5/0073* (2013.01); *H04W 24/10* (2013.01); *H04L 1/0026* (2013.01); *H04W 52/244* (2013.01); *Y02B 60/50* (2013.01)

(58) Field of Classification Search
CPC .................... H04W 24/00; H04L 43/50; H04L 43/0852; H04L 43/08; H04B 17/003
See application file for complete search history.

(56) References Cited

U.S. PATENT DOCUMENTS

| | | | | |
|---|---|---|---|---|
| 2011/0312358 A1* | 12/2011 | Barbieri | ................ | H04W 24/10 455/507 |
| 2012/0082101 A1* | 4/2012 | Gaal | ................. | H04W 72/1268 370/329 |
| 2012/0093010 A1* | 4/2012 | Vajapeyam | ......... | H04W 52/244 370/252 |

FOREIGN PATENT DOCUMENTS

| | | |
|---|---|---|
| JP | 2008-048319 | 2/2008 |
| JP | 2011-518519 | 6/2011 |
| JP | 2011-182009 | 9/2011 |

OTHER PUBLICATIONS

3GPP TSG RAN WG1 Meeting #68, Feb. 6, 2012, Document R1-120673, pp. 1-2.*

(Continued)

*Primary Examiner* — Robert C Scheibel
*Assistant Examiner* — Siren Wei
(74) *Attorney, Agent, or Firm* — Young & Thompson

(57) ABSTRACT

The present approach is applied to a case where, in a radio communication system including a mobile station and a plurality of base stations that communicate with the mobile station in subframe units, each of the plural base stations makes the downlink transmission power to become lower by restricting downlink signals in particular subframes. Herein, the mobile station, if it is a mobile station that cannot designate two types of subframes for performing CQI measurement, calculates a single type of CQI in the cell formed by the base station without recognizing the particular subframes that the base station transmitted and transmits the calculated CQI value to the base station. Each of the plural base stations, when receiving a CQI value from the mobile station, corrects the CQI value into two types if the mobile station is a mobile station that cannot designate two types of subframes for performing CQI measurement.

9 Claims, 7 Drawing Sheets

(51) Int. Cl.
*H04W 24/10* (2009.01)
*H04L 1/00* (2006.01)
*H04W 52/24* (2009.01)

(56) References Cited

OTHER PUBLICATIONS

International Search Report, PCT/JP2012/083233, Feb. 5, 2013.
Hitachi Ltd., Specification Impact of Non-Zero Power Abs, 3GPP TSG-RAN WG1#68, Feb. 6, 2012.
CATT, Considerations on RSRP/RSRQ Definition, 3GPP TSG-RAN WG1#63b R1-110058, Jan. 17, 2011.
Intel Corporation (UK) Ltd, Impacts of non-regular subframes in eICIC time-domain solution, 3GPP TSG-RAN WG2#71 bis R2-105753, Oct. 11, 2010.
Motorola Solutions, RSRQ measurement restriction configurations for eICIC, 3GPP TSG-RAN WG2#72bis R2-110476, Jan. 7, 2011.
CATT, Discussion on the Design of ABS Pattern and its Impact on the Measurement, 3GPP TSG-RAN WG1#63 R1-105935, Nov. 15, 2010.
3rd Generation Partnership Project; Technical Specification Group Radio access Network; Evolved Universal Terrestrial Radio Access (E-UTRA) and Evolved Universal Terrestrial Radio Access Network (E-UTRAN); Overall description; Stage 2 (Release 10), 3GPP TS 36.300 V10.6.0 (Dec. 2011).
Extended European search report, dated Sep. 30, 2015; Application No. 12867918.0.
Panasonic: "Signalling Support for CRS Interference Handling in Low Power ABS", 3GPP Draft; R1-120222, 3rd Generation Partnership Project (3GPP), vol. RAN WG1, no. Dresden, Germany; Feb. 6, 2012-Feb. 10, 2012, Jan. 31, 2012.
KDDI: "Performance evaluations of the signaling schemes for transmission power information", 3GPP Draft; R1-120673_Reduced_Power_KDDI, 3rd Generation Partnership Project (3GPP), vol. RAN WG1, no. Dresden, Germany; Feb. 6, 2012-Feb. 10, 2012, Feb. 1, 2012.

\* cited by examiner

RADIO COMMUNICATION SYSTEM, BASE STATION, AND COMMUNICATION METHOD

TECHNICAL FIELD

The present invention relates to a radio communication system, base station and communication method.

BACKGROUND ART

In LTE (Long Term Evolution) and LTE-Advanced radio communication systems, as shown in FIG. 1, there is a case where, inside a Macro Cell formed by Macro eNB (macro base station) 10 of a certain frequency band, a Pico Cell formed by Pico eNB (pico base station) 20 of the same frequency band is installed.

Recently, in LTE-Advanced (3GPP LTE Rel-10), ABS (Almost Blank Subframe) has been introduced in order to reduce inter-cell interference between a Macro Cell and a Pico Cell installed in the Macro Cell in the same frequency band (Non-patent Document 1).

The ABS is an almost blank subframe, and Macro eNB10 performs transmission by replacing several normal subframes with ABSs. It should be noted that, at least, PDSCH (PHysical Downlink Shared Channel) is not transmitted by ABSs.

Incidentally, in FIG. 1, UE (User Equipment: mobile station) 30-1 that resides in the Pico Cell calculates CQI (Channel Quality Indicator) in the Pico Cell, which is the downlink channel quality information, and reports the calculated CQI value to Pico eNB20. UEs 30-1 and 30-2 that reside in the Macro Cell calculate CQI in the Macro Cell and report the calculated CQI value to Macro eNB10.

Macro eNB10 and Pico eNB20, based on the CQI value reported from each UE, allocate radio resources for downlink signals such as PDSCH, to the UE.

When UE30-1 is UE that supports Rel-10 ABS and can designate two types of subframes as the subframe on which CQI measurement is performed (which will be referred to hereinbelow as Rel-10 UE), Pico eNB20 designates two types of subframes on which CQI measurement should be performed, to Rel-10 UE30-1. As result, Rel-10 UE30-1 calculates two types of CQIs, CQI on the subframes that receive weak interference, and CQI on the subframes that receive strong interference, from the Macro Cell, as the CQI of the subframes that Pico eNB20 transmitted to the Pico Cell.

Specifically, in the example of FIG. 2, subframes #1, #3, #5 and #9 that Macro eNB10 transmitted to the Macro Cell are ABSs so that the interference that the Pico Cell receives from the Macro Cell is weak, while subframes #0, #2, #4, #6, #7 and #8 are normal subframes so that the interference that the Pico Cell receives from the Macro Cell is strong. In this case, Rel-10 UE30-1 calculates two types of CQIs, for subframes #1, #3, #5 and #9 and subframes #0, #2, #4, #6, #7 and #8 that Pico eNB20 transmitted to the Pico Cell. Here, the subframes for performing CQI measurement, designated by Pico eNB20 to Rel-10 UE30-1 may also be part of subframes #1, #3, #5 and #9 and part of subframes #0, #2, #4, #6, #7 and #8. Rel-10 UE30-1 calculates two types of CQIs based on the designated two types of subframes.

In this case, Pico eNB20, using only the CQI value that is calculated based on subframes #1, #3, #5 and #9 that receive weak interference from the Macro Cell, or part of the subframes, from among the two types of CQI values reported from Rel-10 UE30-1, can allocate the radio resources for downlink signals in Macro Cell's ABSs, that is to say subframes #1, #3, #5 and #9, to Rel-10 UE30-1.

With this arrangement, Pico eNB20 can allocate optimal radio resources for downlink signals to Rel-10 UE30-1 in the subframes that receive weak interference from the Macro Cell, based on the CQI value of the subframes.

On the other hand, when UE30-1 that resides in the Pico Cell does not support Rel-10 ABSs, and thus can only designate a single type of subframes for performing CQI measurement (which will be referred to hereinbelow as Rel-8/9 UE), Pico eNB20 can only designate a single type of subframes for performing CQI measurement, for Rel-8/9 UE30-1. As a result, Rel-8/9 UE30-1 calculates one type of CQI as the CQI of the subframes that Pico eNB20 transmitted to the Pico Cell.

Specifically, in the example of FIG. 3, subframes #1, #3, #5 and #9 that Macro eNB10 transmitted to the Macro Cell are ABSs so that the Macro Cell's interference with the Pico Cell is weak, while subframes #0, #2, #4, #6, #7 and #8 are normal subframes so that the Macro Cell's interference with the Pico Cell is strong. Despite that fact, Rel-8/9 UE30-1 calculates only one type of CQI for all the subframes #0 to #9 without considering the difference in interference from the Macro Cell between the two types of subframes.

In this case, Pico eNB20 is unable to take into account the interference from the Macro Cell in allocating radio resources for downlink signals to Rel-8/9 UE30-1, and thus performs radio resource allocation for downlink signals to all the subframes using the single type of CQI value reported by Rel-8/9 UE30-1.

Herein, in general, the single type of CQI value reported by Rel-8/9 UE30-1 is calculated based on both the subframes in which the Pico Cell receives strong interference from the Macro Cell and the subframes in which the Pico Cell receives weak interference from the Macro Cell. Accordingly, the CQI value becomes smaller than the CQI value reported from a Rel-10 UE that resides at the same place because the Rel-10 UE performs calculation based on only the subframes in which the Pico Cell receives weak interference from the Macro Cell.

As a result, Pico eNB20 determines that the CQI of Rel-8/9 UE30-1 as to the subframes in which the Pico Cell receives weak interference from the Macro Cell is inferior to the CQI of the Rel-10 UE that resides at the same place, hence allocates in response to that CQI, a lower order Modulation Scheme (e.g., allocates QPSK instead of 16 QAM) or a lower order Coding Rate to Rel-8/9 UE30-1. Therefore, Rel-8/9 UE30-1 consumes more radio resources for Pico Cell downlink signals than Rel-10 UE that resides at the same place, hence causing a reduction of the capacity of the radio communication system.

Here, though in the examples shown in FIGS. 1 to 3, it is assumed that Macro eNB10 alone transmits ABSs, it may be considered that Pico eNB20, in addition to Macro eNB10, also transmits ABSs.

Now, a case where not only Macro eNB10 but also Pico eNB20 transmits ABSs will be considered in the radio communication system shown in FIG. 4.

Herein, in FIG. 4, UE30-3 that resides in the Pico Cell calculates CQI in the Pico Cell, and reports the calculated CQI value to Pico eNB20. UE30-4 that resides in the Macro Cell calculates CQI in the Macro Cell and reports the calculated CQI value to Macro eNB10.

When UE30-3 that resides in the Pico Cell is a Rel-10 UE, Pico eNB20 designates two types of subframes on which CQI measurement should be performed, to Rel-10 UE30-3.

As result, Rel-10 UE30-3 calculates two types of CQIs, CQI on the subframes that receive weak interference, and CQI on the subframes that receive strong interference, from the Macro Cell, as the CQI of the subframes that Pico eNB20 transmitted to the Pico Cell.

Specifically, in the example of FIG. 5, subframes #1, #3, #5 and #9 that Macro eNB10 transmitted to the Macro Cell are ABSs so that the interference that the Pico Cell receives from the Macro Cell is weak, while subframes #0, #2, #4, #6, #7 and #8 are normal subframes so that the interference that the Pico Cell receives from the Macro Cell is strong. At this stage, Rel-10 UE30-3 calculates two types of CQIs, for subframes #1, #3, #5 and #9 and subframes #0, #2, #4, #6, #7 and #8 that Pico eNB20 transmitted to the Pico Cell. Here, subframes for performing CQI measurement, designated by Pico eNB20 to Rel-10 UE30-3 may also be part of subframes #1, #3, #5 and #9 and part of subframes #0, #2, #4, #6, #7 and #8. Rel-10 UE30-3 calculates two types of CQIs based on the designated two types of subframes.

In this case, Pico eNB20, using only the CQI value that is calculated based on subframes #1, #3, #5 and #9 that receive weak interference from the Macro Cell, or part of the subframes, among the two types of CQI values reported from Rel-10 UE30-3, can allocate the radio resources for downlink signals in Macro Cell's ABSs, that is to say subframes #1, #3, #5 and #9, to Rel-10 UE30-3.

With this arrangement, Pico eNB20 is able to allocate optimal radio resources for downlink signals to Rel-10 UE30-3 in the subframes that receive weak interference from the Macro Cell, based on the CQI value of the subframes.

When UE30-4 that resides in the Macro Cell is a Rel-10 UE, Macro eNB10 designates two types of subframes on which CQI measurement should be performed, to Rel-10 UE30-4. As a result, Rel-10 UE30-4 calculates two types of CQIs, CQI on the subframes that receive weak interference, and CQI on the subframes that receive strong interference, from the Pico Cell, as the CQI of the subframes that Macro eNB10 transmitted to the macro Cell. As an example in which interference from the Pico Cell with the Macro Cell is strong, the case where UE30-4 that resides in the Macro Cell is located near the Pico Cell, the case where the transmission power of Pico eNB20 is high and others can be considered.

Specifically, in the example of FIG. 6, subframes #0, #2, #4, #6, #7 and #8 that Pico eNB20 transmitted to the Pico Cell are ABSs so that the interference that the Macro Cell receives from the Pico Cell is weak, while subframes #1, #3, #5 and #9 are normal subframes so that the interference that the Macro Cell receives from the Pico Cell is strong. In this case, Rel-10 UE30-4 calculates two types of CQIs, for subframes #0, #2, #4, #6, #7 and #8 and subframes #1, #3, #5 and #9 that Macro eNB10 transmitted to the Macro Cell. Here, subframes for performing CQI measurement, designated by Macro eNB10 to Rel-10 UE30-4 may also be part of subframes #1, #3, #5 and #9 and part of subframes #0, #2, #4, #6, #7 and #8. Rel-10 UE30-4 calculates two types of CQIs based on the designated two types of subframes.

In this case, Macro eNB10, using only the CQI value that is calculated based on subframes #0, #2, #4, #6, #7 and #8 that receive weak interference from the Pico Cell, or part of the subframes, among the two types of CQI values reported from Rel-10 UE30-4, can allocate the radio resources for downlink signals in Pico Cell's ABSs, that is to say subframes #0, #2, #4, #6, #7 and #8, to Rel-10 UE30-4.

With this arrangement, Macro eNB10 can allocate optimal radio resources for downlink signals to Rel-10 UE30-4 in the subframes that receive weak interference from the Pico Cell, based on the CQI value of the subframes, On the other hand, when UE30-4 that resides in the Macro Cell is a Rel-8/9 UE, Macro eNB10 can only designate one type of subframes for performing CQI measurement, for Rel-8/9 UE30-4. As a result, Rel-8/9 UE30-4 calculates one type of CQI as the CQI of subframes that Macro eNB10 transmitted to the Macro Cell.

Specifically, in the example of FIG. 7, subframes #0, #2, #4, #6, #7 and #8 that Pico eNB20 transmitted to the Pico Cell are ABSs so that the Pico Cell's interference with the Macro Cell is weak, while subframes #1, #3, #5 and #9 are normal subframes so that the Pico Cell's interference with the Macro Cell is strong. Despite that fact, Rel-8/9 UE30-4 calculates only one type of CQI for all the subframes #0 to #9 without considering the difference in interference from the Pico Cell between the two types of subframes.

In this case, Macro eNB10 is unable to take into account the interference from the Pico Cell in allocating radio resources for downlink signals to Rel-8/9 UE30-4, and thus performs radio resource allocation for downlink signals to all the subframes using the single type of CQI value reported by Rel-8/9 UE30-4.

Herein, in general, the single type of CQI value reported by Rel-8/9 UE30-4 is calculated based on both the subframes in which the Macro Cell receives strong interference from the Pico Cell and the subframes in which the Macro Cell receives weak interference from the Pico Cell. Accordingly, the reported CQI value becomes smaller than that from a Rel-10 UE that resides at the same place because the Rel-10 UE performs calculation based on only the subframes in which the Macro Cell receives weak interference from the Pico Cell.

As a result, Macro eNB10 determines that the CQI of Rel-8/9 UE30-4, as to the subframes in which the Macro Cell receives weak interference from the Pico Cell, is inferior to the CQI of the Rel-10 UE that resides at the same place, and thus allocates in response to that CQI, a lower order Modulation Scheme or a lower order Coding Rate to Rel-8/9 UE30-4. Therefore, Rel-8/9 UE30-4 consumes more radio resources for Macro Cell downlink signals than Rel-10 UE that resides at the same place, hence causing a reduction of the capacity of the radio communication system.

RELATED ART DOCUMENTS

Non-Patent Documents

Non-patent Document 1:
3GPP TS 36.300, V10.6.0 (2011-12)

DISCLOSURE OF THE INVENTION

Problems to be solved by the Invention

Because in the related radio communication system, downward compatibility is guaranteed, UEs of Rel-10 and beyond that can designate two types of subframes for performing CQI measurement and Rel-8/9 UEs that cannot designate two types of subframes for performing CQI measurement, are present at the same time as state above. As a result, there occurs the problem that Rel-8/9 UEs consume more radio resources for downlink signals of the Pico Cell and Macro Cell than UEs of Rel-10 and beyond, hence causing a reduction of the capacity of the radio communication system.

It is therefore an object of the present invention to provide a radio communication system, base station and communication method that can solve the above problem.

Means for Solving the Problems

The radio communication system of the present invention is a radio communication system including a mobile station and a plurality of base stations that communicate with the mobile station in subframe units, wherein
in a case where each of the plural base stations makes the downlink transmission power to become lower by restricting downlink signals in particular subframes, the mobile station is
the mobile station, which is a mobile station that cannot designate two types of subframes for performing CQI measurement, calculates a single type of CQI in the cell formed by the base station without recognizing the particular subframes that the base station transmitted and transmits the calculated CQI value to the base station,
each of the plural base stations, when receiving a CQI value from the mobile station, corrects the CQI value into two types if the mobile station is a mobile station that cannot designate two types of subframes for performing CQI measurement.

The base station of the present invention is a base station that communicates with a mobile station in subframe units, comprising
a control unit, wherein, in a case where the base station makes the downlink transmission power to become lower by restricting downlink signals in particular subframes, when the base station receives a CQI value from the mobile station, the control unit corrects the CQI value into two types if the mobile station is a mobile station that cannot designate two types of subframes for performing CQI measurement.

The communication method of the present invention is a radio communication method for a base station that communicates with a mobile station in subframe units, wherein,
in a case where the base station makes the downlink transmission power to become lower by restricting downlink signals in particular subframes, when the base station receives a CQI value from the mobile station, the CQI value is corrected into two types if the mobile station is a mobile station that cannot designate two types of subframes for performing CQI measurement.

Effect of the Invention

According to the present invention, it is possible to avoid that a particular mobile station consumes more downlink radio resources, and thus prevent a reduction of the capacity of the radio communication system.

MODE FOR CARRYING OUT THE INVENTION

Next, modes for carrying out the present invention will be described with reference to the drawings.

Figure 1:
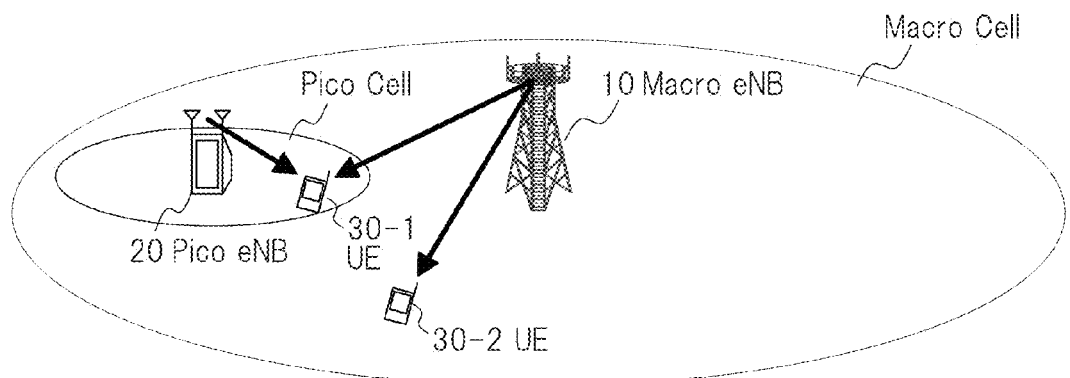
[FIG. 1] is a diagram showing one example of a radio communication system in LTE/LTE-Advanced.
Figure 2:
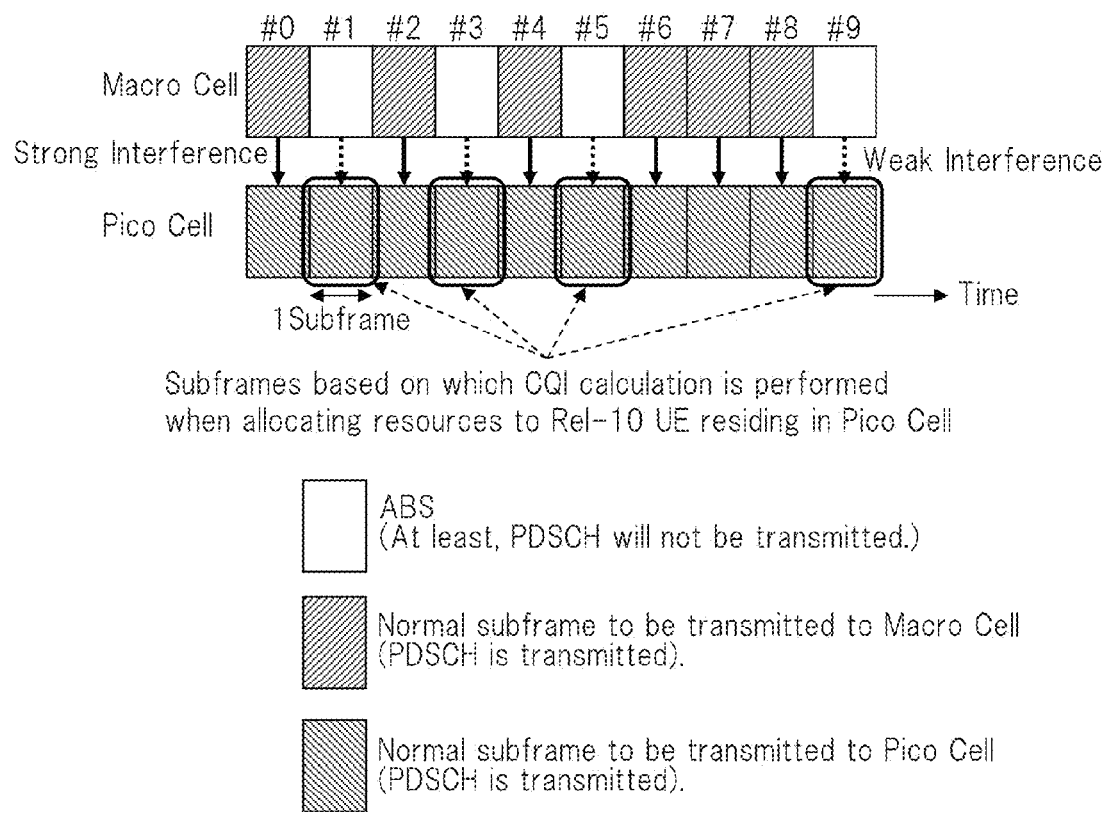
[FIG. 2] is a diagram for explaining a situation of interference between a Macro Cell and a Pico Cell in the radio communication system shown in FIG. 1.
Figure 3:
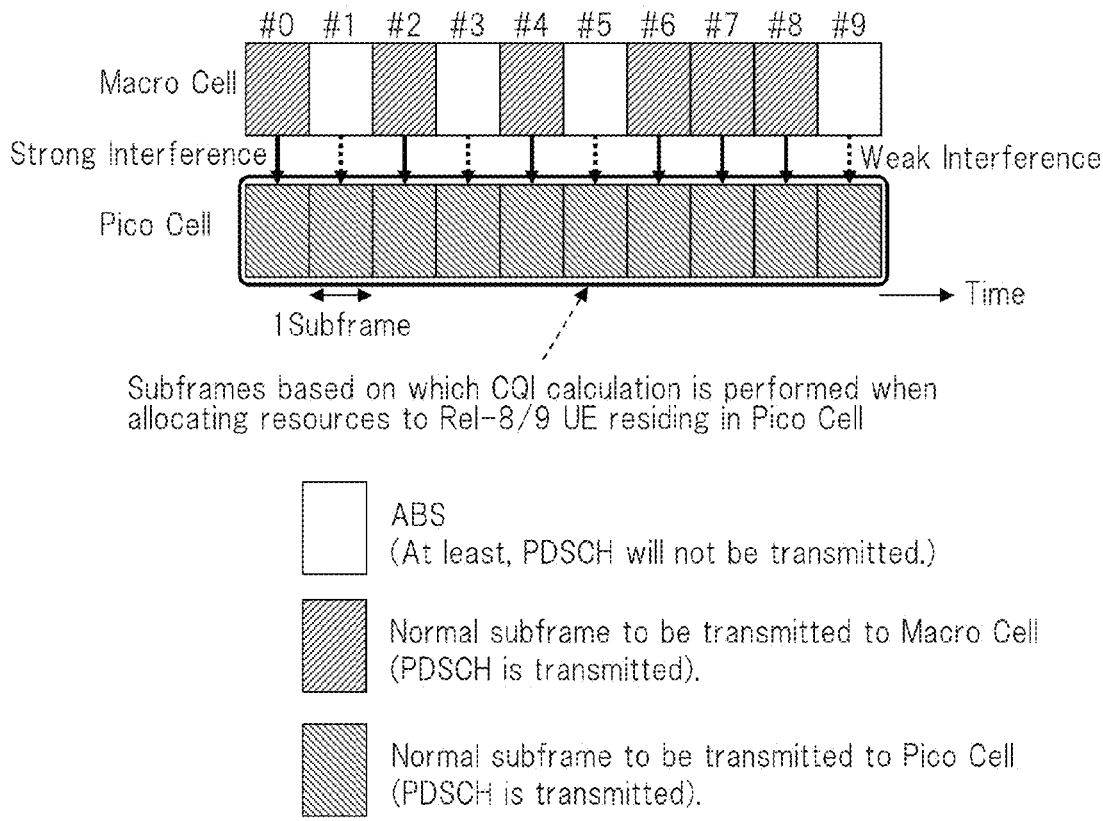
[FIG. 3] is a diagram for explaining a situation of interference between a Macro Cell and a Pico Cell in the radio communication system shown in FIG. 1.
Figure 4:
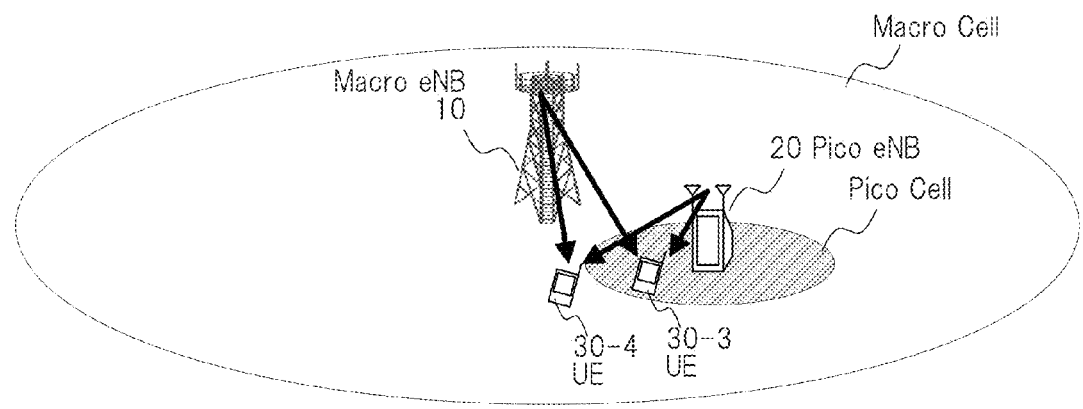
[FIG. 4] is a diagram showing another example of a radio communication system in LTE/LTE-Advanced.
Figure 5:
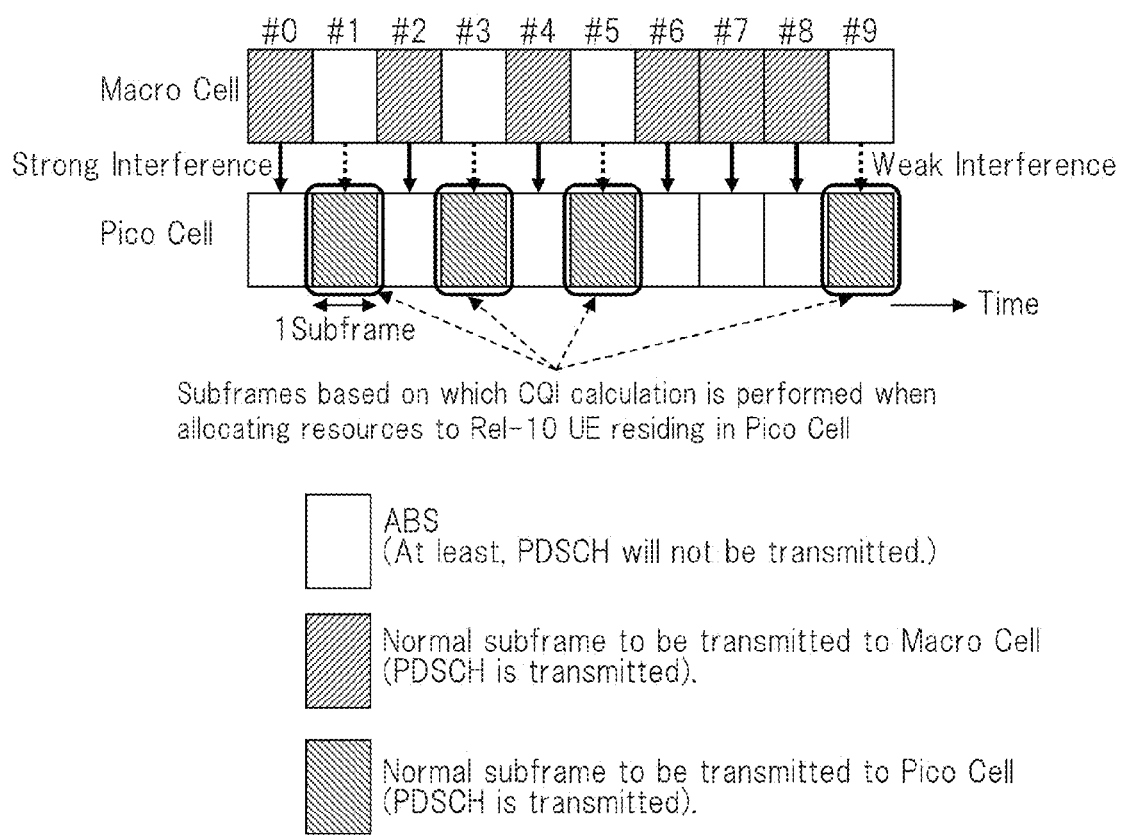
[FIG. 5] is a diagram for explaining a situation of interference between a Macro Cell and a Pico Cell in the radio communication system shown in FIG. 4.
Figure 6:
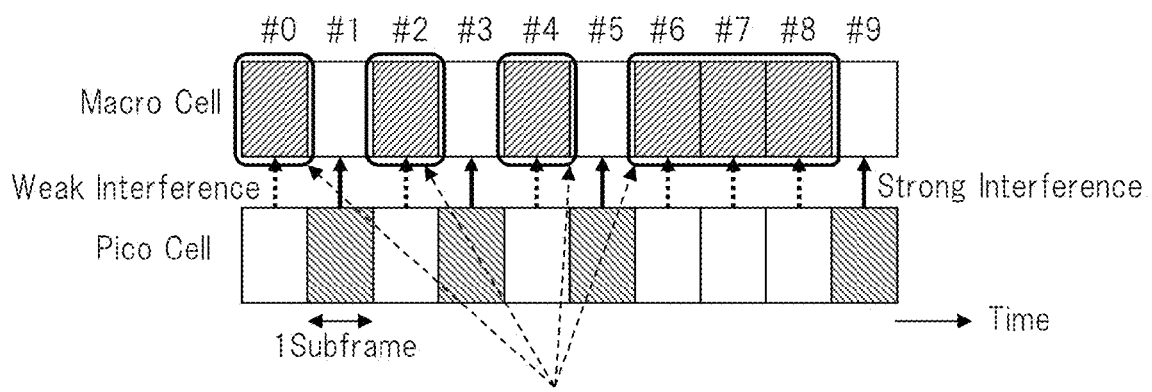
[FIG. 6] is a diagram for explaining a situation of interference between a Macro Cell and a Pico Cell in the radio communication system shown in FIG. 4.
Figure 7:
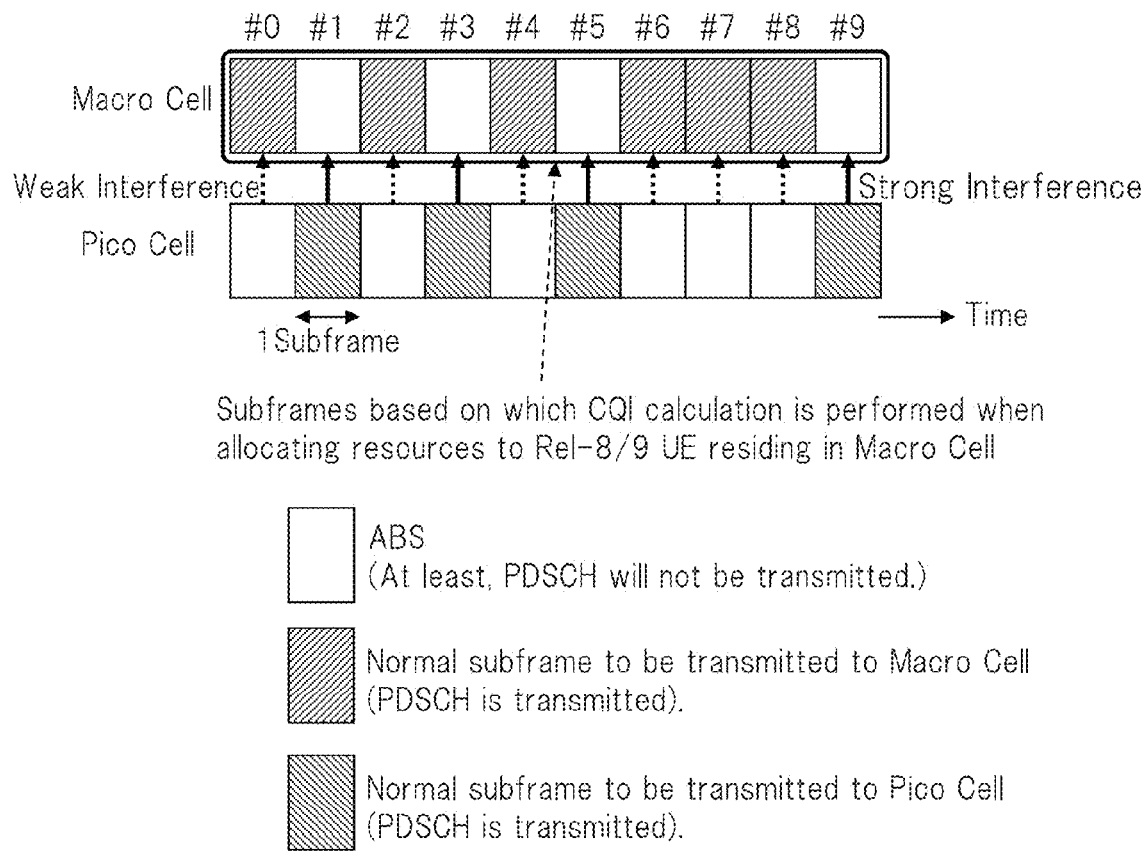
[FIG. 7] is a diagram for explaining a situation of interference between a Macro Cell and a Pico Cell in the radio communication system shown in FIG. 4.

The radio communication system of the present exemplary embodiment has the same overall configuration as that shown in FIG. 1 or FIG. 4, except that new functions are added to Pico eNB 20 and Macro eNB10.

Now, the configurations and operations of Pico eNB20 and Macro eNB10 will be described hereinbelow. In the following description, it is assumed that Pico eNB20 is installed as shown in FIG. 1.

Figure 8:
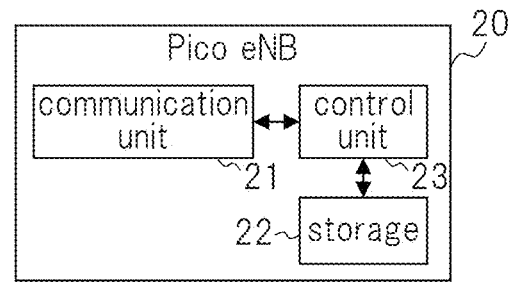
[FIG. 8] is a block diagram showing a configuration of a Pico eNB according to the present exemplary embodiment.

As shown in FIG. 8, Pico eNB20 includes communication unit 21, storage 22, and control unit 23.

Communication unit 21 wirelessly communicates with UE30-1 that resides in the Pico Cell formed by Pico eNB20, in subframe units.

Further, since UE30-1 that resides in the Pico Cell calculates CQI using the subframes that communication unit 21 transmitted and reports the CQI, communication unit 21 receives the CQI value. CQI is downlink channel quality information calculated based on a downlink reference signal, specifically, CRS (Cell-specific Reference Signal), CSI-RS (Channel State Information Reference Signal) or the like, which were known to the UE. The CQI calculation method is not limited. For example, CQI may be calculated based on SINR (Signal-to-Interference and Noise power Ratio).

When receiving a CQI value from UE30-1, control unit 23 corrects the CQI value if UE30-1 is an ABS-incompatible Rel-8/9 UE (UE that cannot designate two types of subframes for performing CQI measurement). Here, whether UE30-1 is of Rel-8/9 or Rel-10 can be notified form UE30-1 to Pico eNB20 by a well-known method.

Control unit 23 determines or modifies the correction parameter to correct the CQI value. This correction parameter is the aftermentioned α, or the ABS ratio, for example.

Storage 22 stores the correction parameter etc., determined or modified by control unit 23. This correction parameter is the aftermentioned α, or the ABS ratio, for example.

Figure 9:
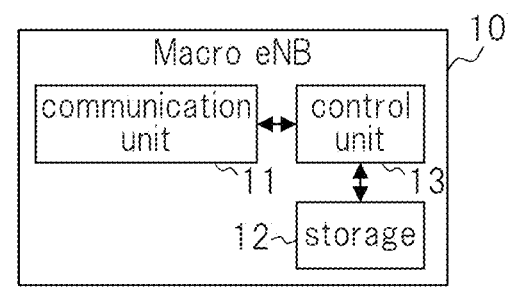
[FIG. 9] is a block diagram showing a configuration of a Macro eNB according to the present exemplary embodiment.

As shown in FIG. 9, Macro eNB 10 includes communication unit 11, storage 12 and control unit 13.

Communication unit 11 wirelessly communicates with UE30-2 that resides in the Macro Cell formed by Macro eNB10, in subframe units.

Since UE30-2 calculates CQI using the subframes that communication unit 11 transmitted and reports the CQI, communication unit 11 receives the CQI value.

When receiving a CQI value from UE30-2, control unit 13 corrects the CQI value if UE30-2 is an ABS-incompatible Rel-8/9 UE (UE cannot designate two types of subframes for performing CQI measurement). Here, whether UE30-1 and 30-2 are of Rel-8/9 or Rel-10 can be notified from UE30-2 to Macro eNB10 by a well-known method.

Control unit 13 determines or modifies the correction parameter to be used for correcting the CQI value. This correction parameter is the aftermentioned $\alpha$, or the ABS ratio, for example.

Storage 12 stores the correction parameter etc., determined or modified by control unit 13. This correction parameter is the aftermentioned $\alpha$, or the ABS ratio, for example.

Figure 10:
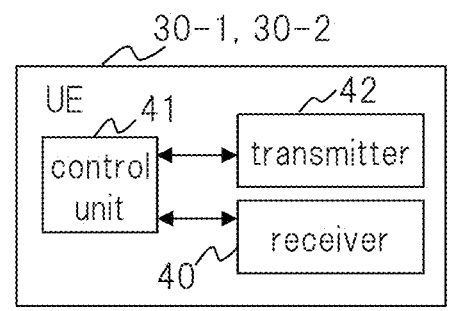
[FIG. 10] is a block diagram showing a configuration of a UE according to the present exemplary embodiment.

Referring to FIG. 10, the configuration of ABS-incompatible Rel-8/9 UEs 30-1 and 30-2 will be described.

As shown in FIG. 10, UEs 30-1 and 30-2 include receiver 40, control unit 41 and transmitter 42.

Receiver 40 receives the downlink reference signal (RS: Reference Signal).

Control unit 41 calculates CQI based on the received reference signal.

Transmitter 42 reports the CQI to Macro eNB10 or Pico eNB20 using the uplink control channel (PUCCH) or uplink shared channel (PUSCH) (CQI report).

Receiver 40, based on the CQI value reported by transmitter 42, receives the resource allocation information on the downlink resources allocated based on the corrected CQI by Macro eNB10 or Pico eNB20. Receiver 40 also receives downlink data from Macro eNB10 or Pico eNB20 using the allocated downlink resources.

Further, transmitter 42 reports success or failure (retransmit request) of data reception to Macro eNB10 or Pico eNB20 using the uplink control channel (PUCCH) or the uplink shared channel (PUSCH) (ACK (Acknowledgment)/NACK (Negative Acknowledgment)).

Next, a specific correction method when the CQI value is calculated from the SINR value will be described. Description herein will be made by giving an example in which Pico eNB20 corrects the SINR value reported from UE30-1 that resides the Pico cell.

(A) SINR Calculation Method in UE
(A-1) For Rel-10 UE that can Designate Two Types of Subframes for Performing CQI Measurement:

When UE30-1 that resides in the Pico cell is a Rel-10 UE, Rel-10 UE30-1 calculates two types of SINR on the subframes that receive strong interference from the Macro Cell (the subframes corresponding to normal subframes of the Macro Cell, which will be referred to hereinbelow as subframe$_{Normal}$) and on the subframes that receive weak interference from the Macro Cell (the subframes corresponding to ABSs of the Macro Cell, which will be referred to hereinbelow as subframe$_{ABS}$), from among the subframes which Pico eNB20 transmitted to the Pico Cell.

Specifically, Rel-10 UE30-1 calculates SINR$_{Normal}$ of subframe$_{Normal}$, as follows:

$$SINR_{Normal}(i) = \frac{RSSI_{Normal}(i)}{ISSI_{Normal}(i)} \quad \text{[Formula 1]}$$

Herein, i represents the subframe number, RSSI$_{Normal}(i)$ represents the RSSI (Received signal strength indicator) in Subrame$_{Normal}$ i, ISSI$_{Normal}(i)$ represents the average ISSI (Interference signal strength indicator) of Subrames$_{Normal}$ up to Subrame$_{Normal}$ i. The method of calculating the average ISSI is not particularly limited. For example, it is possible to use a moving average technique with a forgetting factor.

Rel-10 UE30-1 also calculates SINR$_{ABS}$ of subframe$_{ABS}$, as follows:

$$SINR_{ABS}(i) = \frac{RSSI_{ABS}(i)}{ISSI_{ABS}(i)} \quad \text{[Formula 2]}$$

Herein, i represents the subframe number, RSSI$_{ABS}(i)$ represents the RSSI in Subrame$_{ABS}$ i, ISSI$_{ABS}(i)$ represents the average ISSI of Subrames$_{ABS}$ up to Subrame$_{ABS}$ i.

Rel-10 UE30-1 reports the thus calculated two values, SINR$_{Normal}(i)$ and SINR$_{ABS}(i)$ as CQI values to Pico eNB20. From among these, Pico eNB20 uses the value of SINR$_{ABS}(i)$ to allocate optimal radio resources for downlink signals including Modulation Scheme and Coding Rate to the subframes (subframe$_{ABS}$) that receive weak interference from the Macro Cell, for Rel-10 UE30-1.

It should be noted that since the subframe transmission power of Pico eNB20 is approximately constant, regardless of the subframe type, subframe$_{Normal}$ or subframe$_{ABS}$, the following relation generally holds.

$$RSSI_{Normal}(i) \approx RSSI_{ABS}(i) \quad [3]$$

(A-2) For Rel-8/9 UE that Cannot Designate Two Types of Subframes for Performing CQI Measurement:

When UE30-1 that resides in the Pico cell is a Rel-8/9 UE, Rel-8/9 UE30-1 calculates a single type of SINR as follows:

$$SINR(i) = \frac{RSSI(i)}{ISSI(i)} \quad \text{[Formula 4]}$$

Herein, i represents the subframe number, RSSI(i) represents the RSSI in subframe i, ISSI(i) represents the average ISSI of subframes up to subframe i.

Rel-8/9 UE30-1 reports the thus calculated single value, SINR(i) as a CQI value to Pico eNB20.

(B) The Correction Method of the SINR Value for Rel-8/9 UE30 in the Pico eNB:
(B-1) Correction Method of SINR Value:

As described above, Rel-8/9 UE30-1 transmits a single value, SINR(i).

Herein, suppose that in Rel-8/9 UE30-1, there also exist RSSI$_{Normal}(i)$, ISSI$_{Normal}(i)$, SINR$_{Normal}(i)$, RSSI$_{ABS}(i)$, ISSI$_{ABS}(i)$ and SINR$_{ABS}(i)$ for Subrame$_{Normal}$ and Subrame$_{ABS}$. In this case, the following relations hold:

$$RSSI(i) \approx RSSI_{Normal}(i) \approx RSSI_{ABS}(i) \quad [5]$$

$$ISSI(i) = r ISSI_{ABS}(i) + (1-r) ISSI_{Normal}(i) \quad [6]$$

Here, r represents the ABS ratio ($0 \leq r < 1$), the ratio of ABSs occupying in the total subframes Macro eNB10 transmitted to the Macro cell. The ABS ratio can be notified to Pico eNB20 and Macro eNB10 by a well-known method.

Further, as a relational expression between ISSI$_{Normal}(i)$ and ISSI$_{ABS}(i)$, the following equation is introduced.

$$ISSI_{ABS}(i) : ISSI_{Normal}(i) = \alpha : 1 \quad [7]$$

Here, α is a value (0≤α<1) that indicates the ratio of the ISSI of Subrame$_{ABS}$ to the ISSI of Subrame$_{Normal}$. For example, when Pico eNB20 is located close to Macro eNB10, the ratio of the ISSI of Subrame$_{ABS}$ to the ISSI of Subrame$_{Normal}$ becomes small, so that α becomes small. On the other hand, when Pico eNB20 is located at a distance from Macro eNB10, the ratio of the ISSI of Subrame$_{ABS}$ to the ISSI of Subrame$_{Normal}$ becomes close to 1, so that α becomes large. A determining method of α will be exemplified later (B-2).

From formula 7, the following relation holds:

$$ISSI_{ABS}(i) = \alpha ISSI_{Normal}(i) \quad [8]$$

As a result, the following relational expression holds:

$$SINR(i) = \frac{RSSI(i)}{ISSI(i)} \quad \text{[Formula 9]}$$
$$= \frac{RSSI_{Normal}(i)}{rISSI_{ABS}(i) + (1-r)ISSI_{Normal}(i)}$$
$$= \frac{RSSI_{Normal}(i)}{(1+r\alpha-r)ISSI_{Normal}(i)}$$
$$= \frac{1}{1+r\alpha-r}SINR_{Normal}(i)$$

That is, the following relational expression holds:

$$SINR_{Normal}(i) = (1+r\alpha-r)SINR(i) \quad [10]$$

Similarly, the following expression holds:

$$SINR_{ABS}(i) = \frac{1+r\alpha-r}{\alpha}SINR(i) \quad \text{[Formula 11]}$$

Herein, Pico eNB20 stores ABS ratio r in the Macro cell into storage 22 and manages it.

Accordingly, if α, or the ratio of the ISSI of Subrame$_{ABS}$ to the ISSI of Subrame$_{Normal}$, is additionally given, Pico eNB20 can convert the CQI value reported from UE30-1 to the SINR value and then perform the above correction to create two CQI values, whereby it is possible, similar to Rel-10 UE, to allocate optimal ratio resources for downlink signals including Modulation Scheme and Coding Rate, to the subframes (subframes$_{ABS}$) that receive weak interference from the Macro Cell.

(B-2-1) Example 1 of the Determining Method of α:

To being with, control unit 23 of eNB20 obtains information on the transmission power of the normal subframe and ABS of Macro eNB10, or the reception power of the normal subframe and ABS from Macro eNB10.

For example, control unit 23 receives notice of the information on the transmission power of the normal subframe and ABS through X2 interface.

Further, control unit 23, by itself, measures the reception power of the normal subframe and ABS from Macro eNB10. For example, control unit 23 prepares a time section (radio frame) during which no uplink transmission is allocated to UEs in the Pico cell, and measures the reception power of the normal subframe and ABS from Macro eNB10, using that time section.

Further, control unit 23 may also make an arbitrary UE that resides in the Pico cell to measure the reception power of the normal subframe and ABS from the Macro cell or to measure the measurement including the reception power and to report the measurement to Pico eNB20. Therefore, control unit 23 can obtain information on the reception power from Macro eNB10. For example, the CQIs of the normal subframe and ABS which Rel-10 UE that resides in Pico eNB20 measures, include information on the reception power from Macro eNB10. Accordingly, it is possible to estimate the reception power of the normal subframe and ABS from the Macro Cell by making Rel-10 UE that resides in Pico eNB20 report the CQI values of the normal subframe and ABS.

Next, control unit 23, based on information on the transmission power of the normal subframe and ABS of Macro eNB10 or the reception power of the normal subframe and ABS from Macro eNB10, determines a and stores it into storage 22. Specifically, control unit 23, based on the aforementioned information on the power of the normal subframe and ABS of the Macro eNB10, stores the ratio of the power of ABS to that of normal subframe as α into storage 22.

Here, α is periodically or aperiodically updated, and stored into storage 22 every updating. The cycle of updating is not limited.

(B-2-2) Example 2 of the Determining Method of α:

Control unit 23 previously calculates or sets a as a constant and stores it into storage 22. Specifically, for example, when the ratio between the all radio resources within 1 subframe of a typical downlink signal and the radio resources of the PDSCH is represented by β, α can be approximated by 1-β.

(B-3) Application of α

Control unit 23 uses the a determined by (B-2-1) or (B2-2-2) to correct the CQI value. Specifically, α is applied to formula 10 and formula 11 in (B-1).

Here, in applying α, it is possible to multiply a by a constant or variable coefficient before applying α. Alternatively, it is also possible to round a before applying α. As an example, rounding may be done by assuming that the minimum value of α is 0.1.

Though the conection method of the SINR value in Pico eNB20 has been described heretofore, the same conection method can be used for Macro eNB10.

When, as generally known, the CQI value reported from a UE is conected in an outer loop manner in accordance with success or failure of reception of the downlink signal, formula 10 in (B-1) is applied to the CQI value of the normal subframe first, and then the CQI value of the normal subframe is conected in an outer loop manner in accordance with success or failure of reception of the downlink signal of the normal subframe.

On the other hand, for the CQI value of ABS, formula 11 in (B-1) is applied to the CQI value of ABS first, and then the CQI value of ABS is corrected in an outer loop manner in accordance with success or failure of reception of the downlink signal of ABS.

Figure 11:
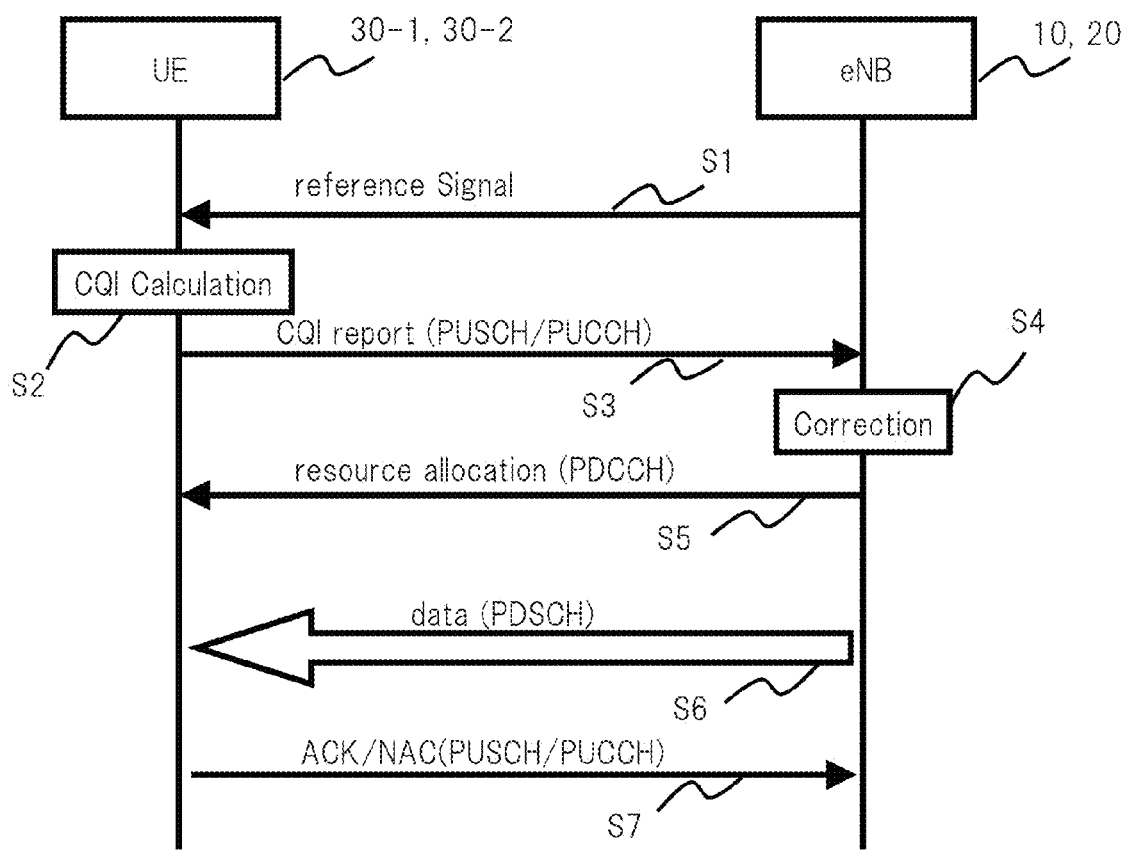
[FIG. 11] is a sequence diagram for explaining a downlink scheduling operation according to the present exemplary embodiment.

Next, the downlink scheduling operation using the above-described conection method of the CQI value will be described with reference to FIG. 11.

ABS-incompatible Rel-8/9 UE 30-1, 30-2 receives the downlink reference signal (RS: Reference Signal) (Step S1).

UE 30-1, 30-2, based on the received reference signal, calculate CQI (Step S2).

UE 30-1, 30-2 reports the calculated CQI value to Macro eNB10 or Pico eNB20 using the uplink control channel (PUCCH) or the uplink shared channel (PUSCH) (CQI report; Step S3).

When receiving a CQI value from UE 30-1, 30-2, Macro eNB10 or Pico eNB20 corrects the CQI value into two types if UE 30-1, 30-2 are ABS-incompatible Rel-8/9 UE (UE that cannot designate two types of subframes for performing CQI measurement) (Step S4). Herein, the conection method described in the above exemplary embodiment should be implemented.

Further, Macro eNB10 or Pico eNB20, based on the received CQI, allocates downlink resources in resource block (RB: Resource Block) units. The control information for allocating resources is transmitted as the downlink L1/L2 control information using the downlink shared channel (PDSCH) (Step S5).

Macro eNB10 or Pico eNB20 transmits downlink data to UE 30-1, 30-2 using the allocated downlink resources (Step S6).

UE 30-1, 30-2 reports success/failure (retransmit request) of the reception data using the uplink control channel (PUCCH) or the uplink shared channel (PUSCH) (ACK/NACK) (Step S7).

As described heretofore, according to the present exemplary embodiment, when receiving a CQI value from a Rel-8/9 UE that cannot designate two types of subframes for performing CQI measurement, Pico eNB20 corrects the CQI value and converts it into two CQI values. As a result, similarly to Rel-10 UE that can designate two types of subframes for performing CQI measurement, it is possible to allocate optimal radio resources for downlink signals including Modulation Scheme and Coding Rate, to the subframes that receive weak interference from the Macro Cell.

Similarly, when receiving a CQI value from a Rel-8/9 UE that cannot designate two types of subframes for performing CQI measurement, Macro eNB10 corrects the CQI value and converts it into two CQI values. As a result, similarly to Rel-10 UE that can designate two types of subframes for performing CQI measurement, it is possible to allocate optimal radio resources for downlink signals including Modulation Scheme and Coding Rate, to the subframes that receive weak interference from the Macro Cell.

Accordingly, even if UEs of Rel-10 and beyond that can designate two types of subframes for performing CQI measurement and Rel-8/9 UEs that cannot designate two types of subframes for performing CQI measurement, are present at the same time, it is possible to prevent the Rel-8/9 UEs from consuming more radio resources for the Pico Cell and Macro Cell downlink signals than UEs of Rel-10 and beyond and from causing a reduction of the capacity of the radio communication system.

Although the present invention has been explained with reference to the exemplary embodiment, the present invention should not be limited to the above exemplary embodiment. Various modifications that can be understood by those skilled in the art may be made to the structures and details of the present invention within the scope of the present invention.

This application claims priority based on Japanese Patent Application No. 2012-27157, filed on Feb. 10, 2012, and incorporates all the disclosure thereof herein.

The invention claimed is:

1. A radio communication system including a mobile station and a plurality of base stations that communicate with the mobile station in subframe units, wherein
   in a case where each of the plural base stations lowers a downlink transmission power by restricting downlink signals in particular subframes, the mobile station, which cannot designate two types of subframes for performing CQI measurement, calculates a single type of a CQI value in a cell formed by a base station without recognizing the particular subframes that the base station transmitted, and transmits the calculated CQI value to the base station, and
   each of the plural base stations, when receiving a CQI value from the mobile station, corrects the CQI value into values that correspond to both of two types of subframes if the mobile station is a mobile station that cannot designate two types of subframes that enable CQI measurement to be performed, each one of said values corresponding to only one of said two types of subframes.

2. The radio communication system according to claim 1, wherein each of the plural base stations, when receiving a CQI value from the mobile station that cannot designate two types of subframes for performing CQI measurement, determines a parameter to be used for correcting the CQI, based on the ratio between the interference of the normal subframes transmitted from a neighbor base station adjacent thereto and the interference of the particular subframes transmitted from the neighbor base station, and based on the ratio between the number of normal subframes and the number of particular subframes.

3. The radio communication system according to claim 2, wherein each of the plural base stations, in determining the ratio between the interference of the normal subframes transmitted from the neighbor base station adjacent thereto and the interference of the particular subframes transmitted from the neighbor base station, receives from the neighbor base station, the transmission power information on the normal subframe of the neighbor base station and the transmission power information on the particular subframe of the neighbor base station, through an inter-base station communication interface.

4. The radio communication system according to claim 2, wherein each base station of the plural base stations, in determining the ratio between the interference of the normal subframes transmitted from the neighbor base station adjacent thereto and the interference of the particular subframes transmitted from the neighbor base station, measures the transmission power of the normal subframes of the neighbor base station and the transmission power of the particular subframes of the neighbor base station, at said base station.

5. The radio communication system according to claim 2, wherein each base station of the plural base stations, in determining the ratio between the interference of the normal subframes transmitted from a neighbor base station adjacent thereto and the interference of the particular subframes transmitted from the neighbor base station, causes one or plural mobile stations that are communicating therewith, to measure the transmission power of the normal subframes of the neighbor base station and the transmission power of the particular subframes of the neighbor base station, or to measure measured quantities that include the transmission powers, and to report the measurements to said base station.

6. The radio communication system according to claim 2, wherein each of the plural base stations has beforehand calculated or set up the ratio between the interference of the normal subframes transmitted from a neighbor base station adjacent thereto and the interference of the particular subframes transmitted from the neighbor base station, as a constant.

7. The radio communication system according to claim 1, wherein in correcting the CQI value into two types if the mobile station is a mobile station that cannot designate two types of subframes that enable CQI measurement to be performed, each of the plural base stations, when the CQI value is further corrected in accordance with success or failure of reception of the downlink signal at the mobile station, further corrects the CQI value that has been corrected to the normal subframe's equivalent, in accordance with success or failure of reception of the downlink signal in the normal subframe at the mobile station, with regard to the normal subframes, and further corrects the CQI value that has been corrected to the particular subframe's equivalent, in accordance with success or failure of reception of the downlink signal in the particular subframe at the mobile station, with regard to the particular subframes.

8. A base station that communicates with a mobile station in subframe units, comprising:
   a controller,
   wherein, in a case where the base station lowers a downlink transmission power by restricting downlink signals in particular subframes, when the base station receives a CQI value from the mobile station, the controller corrects the CQI value into values that correspond to both of two types of subframes if the mobile station is a mobile station that cannot designate two types of subframes that enable CQI measurement to be performed, each one of said values corresponding to only one of said two types of subframes.

9. A radio communication method for a base station that communicates with a mobile station in subframe units, wherein, in a case where the base station lowers a downlink transmission power by restricting downlink signals in particular subframes, when the base station receives a CQI value from the mobile station, the CQI value is corrected into values that correspond to both of two types of subframes if the mobile station is a mobile station that cannot designate two types of subframes that enable CQI measurement to be performed, each one of said values corresponding to only one of said two types of subframes.

* * * * *